Jan. 18, 1966  L. W. MARSH, JR  3,230,407
ELECTROMAGNETIC TRANSDUCERS
Filed Aug. 1, 1962  7 Sheets-Sheet 1

INVENTOR.
LYNN W. MARSH, JR.
BY
Kenway, Jenney & Hildreth
ATTORNEYS

Jan. 18, 1966  L. W. MARSH, JR  3,230,407
ELECTROMAGNETIC TRANSDUCERS
Filed Aug. 1, 1962  7 Sheets-Sheet 2

INVENTOR.
LYNN W. MARSH, JR.
BY
*Kenway, Jenney & Hildreth*
ATTORNEYS

Jan. 18, 1966  L. W. MARSH, JR  3,230,407
ELECTROMAGNETIC TRANSDUCERS

Filed Aug. 1, 1962  7 Sheets-Sheet 3

(f) $E_{6b}$ (e) $E_{Sb}$ (d) $E_{6a}$ (c) $E_{Sa}$ (b) $\phi_{L_1}$ (a) Portion of Disc Adjacent Sensing Pole

FIG. 24

(e) $E_{6d}$ (d) $E_{Sd}$ (c) $E_{6c}$ (b) $\phi_L$ (a)

FIG. 25

INVENTOR.
LYNN W. MARSH, JR.
BY
Kenway, Jenney & Hildreth
ATTORNEYS

Jan. 18, 1966     L. W. MARSH, JR     3,230,407
ELECTROMAGNETIC TRANSDUCERS
Filed Aug. 1, 1962     7 Sheets-Sheet 4

INVENTOR.
LYNN W. MARSH, JR.
BY
Kenway, Jenney & Hildreth
ATTORNEYS

Jan. 18, 1966    L. W. MARSH, JR    3,230,407
ELECTROMAGNETIC TRANSDUCERS
Filed Aug. 1, 1962    7 Sheets-Sheet 5

INVENTOR.
LYNN W. MARSH, JR.
BY
ATTORNEYS

Jan. 18, 1966   L. W. MARSH, JR   3,230,407
ELECTROMAGNETIC TRANSDUCERS
Filed Aug. 1, 1962   7 Sheets-Sheet 6

INVENTOR.
LYNN W. MARSH, JR.
BY
ATTORNEYS

Jan. 18, 1966   L. W. MARSH, JR   3,230,407
ELECTROMAGNETIC TRANSDUCERS

Filed Aug. 1, 1962   7 Sheets-Sheet 7

FIG. 36

INVENTOR.
LYNN W. MARSH, JR.
BY
Kenway, Jenney + Hildreth
ATTORNEYS

United States Patent Office 3,230,407
Patented Jan. 18, 1966

3,230,407
ELECTROMAGNETIC TRANSDUCERS
Lynn W. Marsh, Jr., Marblehead, Mass., assignor to Anelex Corporation, Boston, Mass., a corporation of New Hampshire
Filed Aug. 1, 1962, Ser. No. 214,111
2 Claims. (Cl. 310—168)

My invention relates to electromagnetic transducers, and specifically to a transducer for producing electrical pulses of short rise and fall times in response to the speed or position of a movable magnetically coded element.

There are numerous applications for cyclic code generators and electrical pulse generators which produce code sequences of indexing pulses in response to the translation or rotation of a magnetically coded element. For example, in the high speed printer art, it is common to mark the instantaneous position of a continuously rotating print roll bearing a font of characters with a series of pulses or a series of code pulse sequences which are generated at specific angles of rotation of the print wheel. The use of pulse generators of this type as shown, for example, in my copending application Serial No. 178,-445, filed March 8, 1962 for Control System for High Speed Printers. Obviously, the ultimate speed and precision with which equipment controlled by pulse generators of this type can be operated depends upon the signal-to-noise ratio of the pulse train produced. It is an important object of my invention to greatly improve the signal-to-noise ratio of pulse and pattern generators of this type.

Basically, my invention comprises an improved transducer for transforming the angular position of a magnetically coded disc to electrical pulses in three steps. The first consists in inducing a coded flux, as in response to the motion or position of a magnetically coded disc, into a magnetic circuit which has a low reluctance coupling to the coded disc. Second, this coded flux is coupled into a saturable circuit, comprising a circuit element of square hysteresis characteristics or of such restricted cross section that it may readily be saturated by the applied flux. The third step comprises linking the flux induced into the saturable circuit with an electromagnetic coil to produce an output pulse corresponding to each flux reversal in the saturable circuit. As will appear, various auxiliary coils may be employed in the circuit to facilitate sampling the output of the circuit at a particular time, or to modify the magnetic coding of the disc.

The coding of the disc may be accomplished in various ways; as will appear, it may be accomplished by merely employing an unmagnetized soft iron disc having teeth formed by slots cut about its periphery. Also, the coding may be accomplished by magnetically polarizing projecting teeth fomed on the disc in a selected pattern.

In carrying out my invention, I provide a first magnetic circuit having a low reluctance coupling portion disposed to be affected by the magnetic coding of a disc to produce a coded flux. This circuit is provided with a high reluctance portion, which may comprise a gap, and a second saturable circuit is located adjacent to or shunting the gap to carry a sufficient portion of the coded flux to saturate it in one sense or an opposite sense in accordance with the coding of the flux. An output coil is provided to link the flux in the saturable element. In this manner, electrical output pulses having very short rise and fall times may be produced, even though the primary flux induced in the first circuit may have relatively long rise and fall times and may be contaminated by transients.

My invention will best be understood by reference to the accompanying drawings, together with the following detailed description, of various illustrative embodiments thereof, which incorpoarte the means by which I prefer to carry out my invention.

Figure 1:
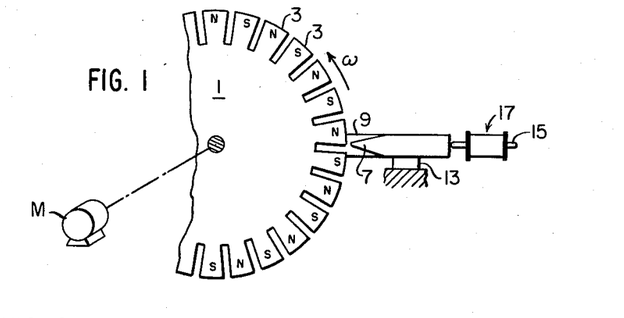
FIG. 1 is a schematic diagram of a transducer in accordance with a first embodiment of my invention.

Referring first to FIG. 1, I have shown a transducer in accordance with one embodiment of my invention which comprises a coded magnetic disc 1 including a central body portion and a plurality of projecting teeth 3 formed about its periphery and separated by slots. These slots are not essential to my invention, and the regions on the periphery of the disc may simply be defined magnetically, if so desired; however, the slots increase the rate of change of flux produced. As schematically indicated, the projecting teeth 3 are alternately magnetically coded by being magnetized with their outer extremities north or south with respect to their inner portions, in an alternating fashion, around the periphery of the disc. The disc is arranged to be rotated about its central axis by a suitable means such as a constant speed motor M.

Figure 2:
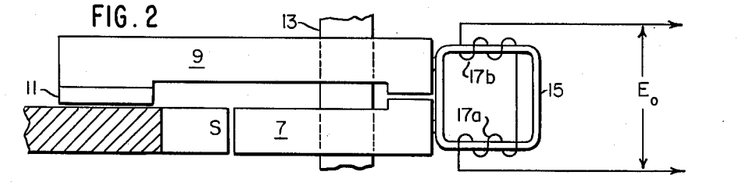
FIG. 2 is a fragmentary plan view of the transducer of FIG. 1.
Figure 3:
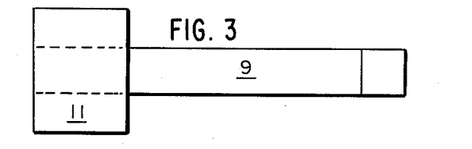
FIG. 3 is a schematic elevational view of a return pole shown in FIG. 2.

A primary magnetic circuit is provided for sensing the polarity of the teeth 3 on the disc 1. This circuit comprises a sensing pole 7 having a tapered edge confronting the periphery of the disc and made of any suitable low reluctance ferromagnetic material. A return pole 9 is provided which is separated from the sensing pole 7 by a suitable high reluctance portion, here shown as an air gap. The return pole is provided with a pole shoe 11 of relatively large area, as best shown in FIGS. 2 and 3, which serves to make the gap between the return pole 9 and the body of the disc 1 relatively small. The assembly comprising the sensing pole 7 and the return pole 9 may be affixed to any suitable support by means of a suitable bracket such as 13. The return pole 9 on the pole shoe 11 may also be made of relatively soft magnetic material. The reason for the use of this type of material in the primary circuit is that high reluctance materials are relatively magnetically hard materials, and require an appreciable time to change in flux density. By the use of relatively soft magnetic material, I am enable to provide a very sensitive response to the change in flux induced by the rotation of the disc 1.

A secondary magnetic circuit is provided which comprises a saturable element 15. This element may be in the form of a wire of high reluctance ferromagnetic material having high remanance and an essentially square hysteresis loop characteristic. Suitable materials are high-nickel irons such as Permalloy and Hypernick, and copper-nickel iron alloys such as Cunife. The cross-sectional area of the saturable element 15 determines the flux magnitude required to switch it from one saturated state to an opposite saturated state. Accordingly, this area is preferably small, and the element 15 may typically be on the order of magnitude of 0.01 inch to 0.1 inch in diameter. In response to the relatively high flux densities produced in the primary magnetic circuit, the secondary circuit will switch very rapidly to either of its saturated states.

An output coil 17 is wound to link the flux in the secondary magnetic circuit comprising the saturable element 15. As shown in FIG. 2, this coil may be formed as a pair of coils 17a and 17b, if so desired. The saturable element 15 may be mechanically secured to the sensing pole 7 and the return pole 9 in any suitable manner, as by spot welding or the like.

Figure 4:
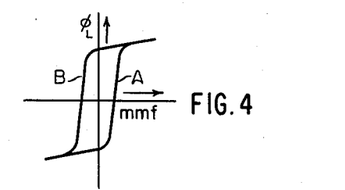
FIG. 4 is a graph of a typical hysteresis loop for the secondary magnetic circuit of the transducer shown in FIGS. 1–3.

Referring now to FIG. 4, a typical hysteresis loop for a material suitable for use as the saturable element 15 is shown. Application of magnetomotive force in the sense illustrated as being to the right in FIG. 4 will drive the saturable element to saturation along the line A. Application of reverse magnetomotive force will return the material to saturation in the opposite direction, along the line B.

Figure 5:
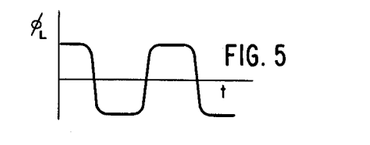
FIG. 5 is a graph of the magnetomotive force in the primary magnetic circiut of the transducer shown in FIGS. 1–3.

Referring now to FIG. 5, as the face of a south magnetized tooth 3 on the disc 1 in FIG. 1 passes the sensing pole, a flux of a first sense is induced in the primary magnetic circuit and the secondary magnetic circuit is switched to a saturated state. As a gap passes adjacent the sensing pole, the flux falls, and as the next north polarized tooth approaches, the flux continues to fall and the secondary circuit is switched to its opposite state. This action is reversed when the next gap appears adjacent the sensing pole. Accordingly, a flux characteristic of the type shown in FIG. 5 is produced.

Figure 6:
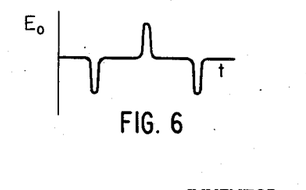
FIG. 6 is a graph showing the output voltage produced by the transducer of FIGS. 1–3.

Referring now to FIG. 6, as the flux in the secondary circuit is changed, a pulse of voltage $E_0$ is produced in the output coil 17 which is of one sense or opposite sense according as the flux changes in one or an opposite sense. Thus, a series of alternately positive and negative output pulses is produced which mark the slot locations on the periphery of the disc. These pulses may be used to mark particular angular positions of the disc, as for use in index pulse generators, character pulse generators, and the like, of the type shown and described in my above-referred to copending application.

Figure 7:
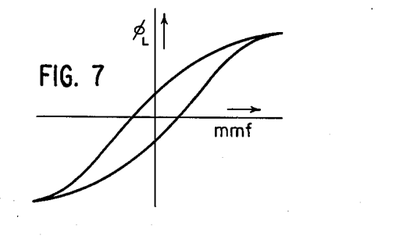
FIG. 7 is a graph of a typical hysteresis loop of a secondary circuit suitable for use in the transducer of FIGS. 1–3, which is not made of saturable material but which has a sufficiently restricted cross section to be effectively saturated.
Figure 8:
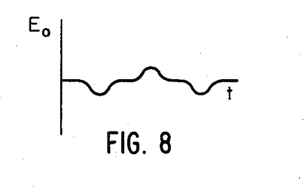
FIG. 8 is a graph showing the output voltage of the transducer of FIGS. 1–3 using a secondary magnetic circuit of restricted cross section.

While sharper output pulses may be obtained by employing saturable material for the saturable element 15, good results may also be obtained by using a material having normal hysteresis characteristics, such as iron, steel or the like, which has a sufficiently restricted cross section to be substantially saturated by the massive flux changes in the primary magnetic circuit. Such a material may exhibit a hysteresis loop of the type shown in FIG. 7. As shown in FIG. 8, the output voltage $E_0$ will comprise pulses with somewhat longer rise and fall times than those obtained by the use of a saturable material, but these may still be quite short with respect to the rise time of the flux in the primary circuit.

Figure 9:
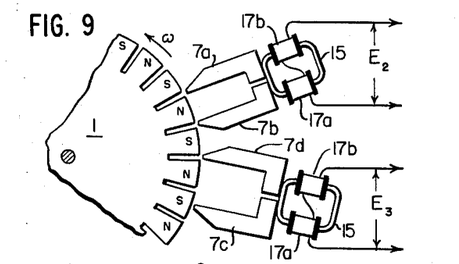
FIG. 9 is a schematic diagram of a transducer employing a modified form of primary magnetic circuit, and illustrating two relative arrangements of the primary circuit elements.

Referring now to FIG. 9, I have shown a second embodiment of my invention in which the primary magnetic circuit is returned magnetically to the periphery of the disc rather than to the body thereof. For this purpose, I have provided a primary circuit comprising a pair of sensing poles 7a and 7b, separated one from the other by a back gap, and each provided with a tapered end mounted adjacent the periphery of the disc. These poles may be supported in any suitable manner, as described in connection with FIG. 1.

A secondary magnetic circuit, comprising the saturable element 15, which is provided with the output coils 17a and 17b, may be the same as in the previously described embodiment. As shown in the upper portion of FIG. 9, the sensing poles 7a and 7b may have their ends disposed to simultaneously register with slots in the periphery of the disc. With this relative spacing, an output voltage of the type shown in FIG. 10a will be produced. Each time the pole 7a registers with the slot as it goes from a south magnetized tooth to a north magnetized tooth, the other sensing pole 7b will go from a north magnetized pole through a slot to a south magnetized pole. Each of these transitions thus produces a pulse of voltage $E_2$ having approximately double the magnitude available in the FIG. 1 construction, and of a polarity depending on whether the pole 7a is moving from a south pole to a north pole, or vice versa.

Figures 10A, 10B:
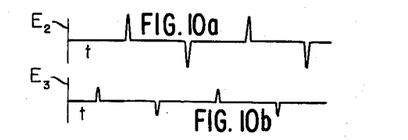
FIG. 10a is a graph showing the output voltage produced by the first arrangement of the primary circuit shown in FIG. 9.
FIG. 10b is a graph showing the output voltage produced by the second arrangement of the primary circuit shown in FIG. 9.

As shown in the lower portion of FIG. 9, in a similar construction, the poles 7d and 7c are arranged so that the pole 7d will register with a slot while the pole 7c registers with a tooth. With this arrangement, an output voltage wave form $E_3$ of the type shown in FIG. 10b is obtained. There are the same number of pulses as in the FIG. 10a output wave form, and the pulses are of the same magnitude.

Figure 11:
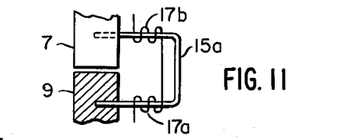
FIG. 11 shows an alternate manner in which the secondary magnetic circuit of the transducer of my invention may be constructed.

Referring now to FIG. 11, I have shown an alternate manner of connecting the secondary magnetic circuit, here shown as a saturable element 15a. As shown, in this embodiment the saturable element 15 is inserted into holes drilled into the sensing pole 7 and the return pole 9. This construction provides a direct magnetic shunt of the gap between the poles, and is a simple matter to construct.

Figure 12:
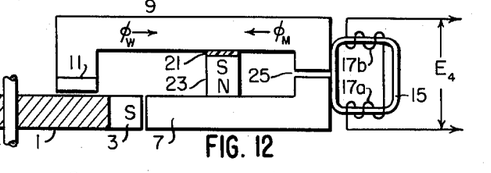
FIG. 12 shows a modification of the transducer of my invention in which an enhanced rise and fall time may be obtained.
Figure 13:
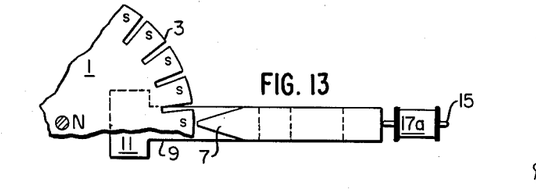
FIG. 13 is a fragmentary elevational view of the transducer of FIG. 12.

Referring now to FIGS. 12 and 13, I have shown another embodiment of my invention in which a double flux reversal is provided for each slot in the disc passing the sensing pole. As shown in FIGS. 12 and 13, the transducer is the same as that shown in FIGS. 1 and 2, except that a biasing means in the form of a permanent magnet 23 is inserted aross the poles 7 and 9, and separated from one of them by a gap, which may be filled by a suitable spacer 21 of a non-magnetic material such as plastic or the like. A similar spacer 25 may be employed in the back gap; in fact, this spacer may be employed instead of an air gap in any of the previously described embodiments. By the provision of the biasing magnet 23, saturating flux for the secondary magnetic circuit comprising the saturable element 15 will be applied when the sensing pole 7 is adjacent a slot. As shown in FIG. 13, each of the teeth 3 of the disc 1 are preferably magnetized to the same polarity, here shown as south with respect to the body of the disc, which is magnetized north. Of course, if the biasing magnet 23 were reversed, the polarization of the teeth should be similarly reversed.

Figure 14:
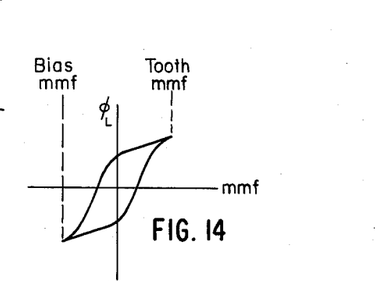
FIG. 14 is a graph of the hysteresis loop of the secondary circuit of the transducer of FIGS. 12 and 13.

The gap provided by the spacer 21 is so selected with respect to the magnetomotive forces produced by the biasing magnet 23 and the disc 1 that when the tip of the sensing pole 7 is adjacent a tooth, the flux of the biasing magnet is overcome and the saturable element 15 is saturated in one direction. When the tip of the sensing pole passes over a slot, this flux is removed and the flux from the biasing magnet 23 is sufficient to saturate the saturable element 15 in the opposite sense. This relationship is indicated, in relation to a typical hysteresis loop for the saturable element 15, in FIG. 14.

Figure 15A:
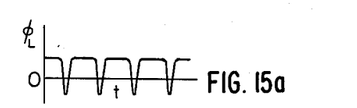
FIG. 15a is a graph of the magnetomotive force produced by the transducer of FIGS. 12 and 13.
Figure 15B:
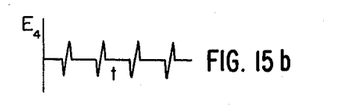
FIG. 15b is a graph showing the output voltage produced by the transducer of FIGS. 12 and 13.

Referring now to FIG. 15a, the flux in the saturable element 15 is plotted as a function of time. As illustrated, each time a slot is passed, the flux is reversed, and is reversed again when the next tooth is encountered. FIG. 15b shows the output voltage $E_4$ produced by these variations of the flux in the secondary circuit.

Figure 16:
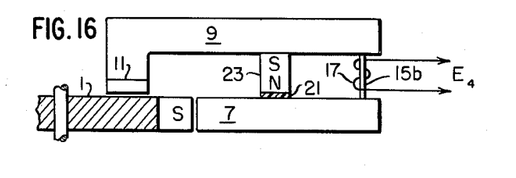
FIG. 16 is a schematic plan view of a modified form of the transducer of FIGS. 12 and 13.

FIG. 16 shows an alternate manner in which the transducer of FIGS. 12 and 13 can be constructed. As indicated, the back gap between the poles 7 and 9 is quite large, and is shunted directly by a saturable element 15b which may be inserted in suitable holes drilled in the poles 7 and 9. The output coil 17 may be wound about the saturable element 15b in the manner sufficiently illustrated in FIG. 16.

Figure 17:
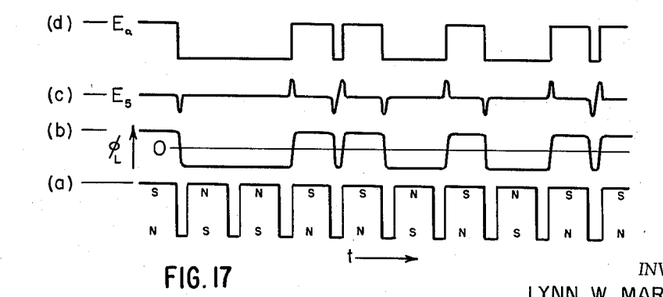
FIG. 17 is a graph illustrating the operation of a transducer in accordance with FIGS. 12 and 13 or 16 and in which the disc is coded in a selected sequence of alternating polarities.

For many purposes, it is desired not only to mark the location of each reference angular position of the shaft carrying the disc 1, but to generate a particular output signal identified with that angular position. In this manner, for example, a coded pulse train may be produced. A plurality of transducers on the same shaft may be employed to generate different pulse trains, such that a series of character code pulse sequences suited to identify the characters in position on a print wheel of the type shown in the above-referred to copending application may be generated. For this puropse, the teeth 3 of the disc 1 are coded in a specific sequence selected to form the desired code pulse train. Referring now to FIG. 17, a graph of the portion of the periphery of the disc 1 adjacent the sensing pole 7 as a function of time is shown. This graph may be regarded as a development of the periphery of the disc, and indicates the various teeth and their relative polarities. The particular polarity sequence shown is merely illustrative, as it will be apparent that any desired code sequence could be employed.

Assuming the sequence of tooth polarizations shown in FIG. 17, and a biased primary magnetic circuit of the type shown in FIGS. 12 and 13 or in FIG. 16, the flux in the saturable element 15 will behave in the manner shown in FIG. 17 as the sensing pole 7 moves across the portions of the teeth illustrated in FIG. 17. As shown, a south polarized tooth adjacent the sensing pole produces sufficient flux to bias the saturable element to saturation in one sense. However, when the next slot is encountered, the flux from the biasing magnet 23 is sufficient to saturate the element in the opposite sense. As a slot between two north polarized teeth is encountered, the biasing magnet will maintain the saturable element in its saturated state. However, as shown in FIG. 17, when a slot between two south polarized teeth is encountered, the biasing magnet will temporarily switch the saturable element back to its opposite saturated state. The resulting output voltage $E_5$ takes the form shown in FIG. 17. Thus, a single pulse of one polarity is encountered in a transition from a south polarized tooth to a north polarized tooth, and a single pulse of opposite polarity is produced by a transition from a north polarized tooth to a south polarized tooth. No output pulses are produced by a transition from a north polarized tooth to a north polarized tooth. A transition from a south polarized tooth to another south polarized tooth results in the formation of a pair of oppositely poled pulses.

Figure 18:
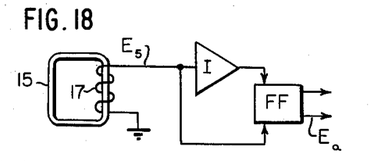
FIG. 18 is a schematic wiring diagram of a circuit comprising the output coil of any of the transducers in accordance with my invention operated in the manner illustrated in FIG. 17 for producing rectangular output pulses.

The output pulse train $E_5$ may be supplied to a flip-flop such as the flip-flop FF in FIG. 18. With one input terminal of the flip-flop FF being supplied directly from the coil 17 and the other being supplied through an inverter I, as shown, one output terminal of the flip-flop, having a potential represented by $E_a$, will produce a wave from of the type shown in FIG. 17. It will be apparent that if this voltage $E_a$ is sampled at the time corresponding to the registry of the sensing pole 7 with some portion of a tooth, the state of the flip-flop as represented by the voltage $E_a$ will indicate the relative polarization of the tooth. A conventional Schmidt trigger circuit may also be employed as the indicating circuit. It will be apparent that suitable sampling pulses may be provided by a transducer of any of the forms previously described. Also, either the output voltage $E_5$ of the coil 17 or the output voltage $E_a$ of the flip-flop may be employed as a coded pulse train for use in circuit which are to be controlled as a function of the angular position of the disc 1.

Figure 19:
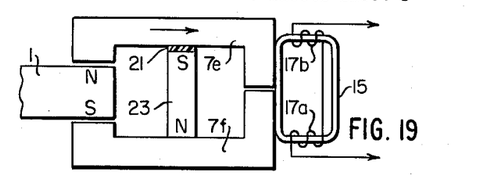
FIG. 19 is a schematic plan view of a modified form of the transducer of FIGS. 12, 13 and 16.

Referring now to FIG. 19, I have shown another embodiment of my invention in which the disc 1 is polarized along lines parallel to its central axis, rather than radially as before. Thus, one side of the disc may be polarized north and the opposite side south. Slots are not necessary to define the regions of different polarization along the periphery of the disc, as in the previous embodiments. However, they may be employed to make the transitions sharper. As shown, two sensing poles are employed in this embodiment, the poles 7e and 7f each being separated from the other by a back gap, and from the disc 1 by an air gap. Preferably, a biasing magnet 23 and a spacer 21 shunt the poles 7e and 7f, for the purposes previously described. The secondary magnetic circuit, comprising the saturable element 15, wound with the output coils 17a and 17b, may be assembled as previously described.

Figure 20:
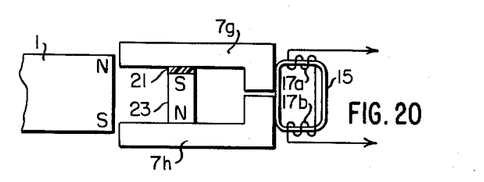
FIG. 20 is a schematic plan view of another modification of the transducer of FIGS. 12, 13 and 16.

FIG. 20 shows another manner in which sensing poles 7g and 7h may be arranged to pick off a region on the periphery of the disc which is polarized parallel to the central axis of the disc. This transducer may otherwise be the same as those previously described.

Figure 21:
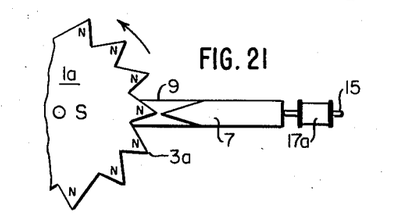
FIG. 21 is a fragmentary elevational view of a transducer in accordance with my invention comprising a modified form of coded disc which may be employed in any of the previously illustrated embodiments.

FIG. 21 shows an embodiment of the coded disc 1 of my invention comprising a disc 1a having triangular teeth such as 3a formed thereon. Assuming that the disc 1a is rotated in the sense illustrated by the curved arrow, the transition from tooth to slot will be much sharper than with the flat teeth 3 previously described. This configuration may be employed in any of the previously described embodiments to enhance the rise and fall times of the electrical output pulses.

Figure 22:
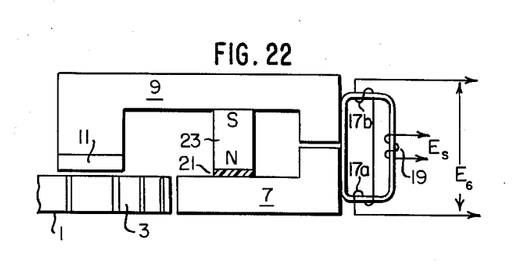
FIG. 22 is a fragmentary schematic plan view of a transducer in accordance with my invention and embodying an auxiliary electromagnetic coil in the secondary magnetic circuit.

FIG. 22 shows an embodiment of the transducer of my invention which is adapted to produce a train of output pulses corresponding to the coded sequence of north and south polarized teeth on a disc 1. This embodiment may be the same as that shown in FIG. 12, for example, except that the saturable element 15 is provided with an auxiliary coil 19, which serves as a primary coil to supply a train of strobe pulses to the secondary magnetic circuit. The biasing magnet 23 is sufficient to switch the saturable element 15 beyond saturation whether a north polarized tooth or a south polarized tooth is adjacent the sensing pole 7. However, if a south polarized tooth is adjacent the sensing pole and a strobe pulse is simultaneously applied to the auxiliary coil 19, the saturable element 15 may be driven to saturation in the opposite sense.

Figure 24:
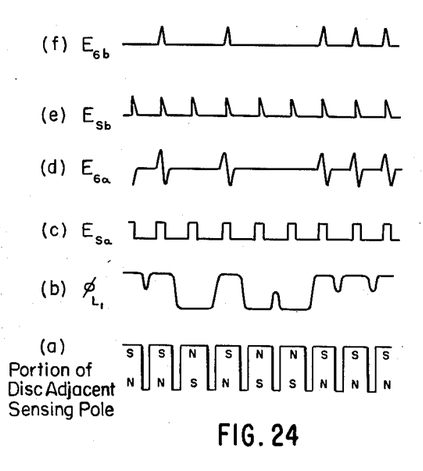
FIG. 24 comprises a series of graphs illustrating the operation of the transducer of FIG. 23.

Referring now to FIG. 24, a typical sequence of operation of the transducer shown in FIG. 22 is illustrated. A sequence of teeth having a desired code sequence of polarities is shown in FIG. 24a. Specifically, FIG. 24a is a graph of the portion of the periphery of the disc 1 adjacent the sensing pole 7 as a function of time. FIG. 24b shows a flux component $L_1$ which is induced in the saturable element 15 as a result of the movement of the teeth past the sensing pole. It does not include the component produced by the biasing magnet, or the effect of the strobe pulses applied to the winding 19. The effect of the biasing magnet 23 is to hold the saturable element 15 in saturation despite the flux variations produced by the disc 1. The function of the strobe pulses is to temporarily overpower the biasing magnet so that the polarity of the tooth then adjacent the sensing pole may be determined. As shown in FIG. 24c, the strobe pulses applied to the winding 19 may comprise a train of rectangular pulses $E_{sa}$. These pulses are timed to coincide with the registry of the sensing pole with each tooth. As shown in FIG. 24d, the output voltage $E_{6a}$ produced by these strobe pulses $E_{sa}$ comprises a pair of pulses of opposite polarity if the tooth is a south-polarized tooth, and zero voltage if the tooth is a north-polarized tooth.

FIG. 24e shows an alternate wave form $E_{sb}$ that may be employed to provide strobe pulses. These pulses are triangular, having a sharp rise time and an exponential fall time. The output voltage $E_{6b}$ produced in response to these strobe pulses is shown in FIG. 24f. As shown, the output comprises a single pulse of one polarity for each south-polarized tooth encountered.

Figure 25:
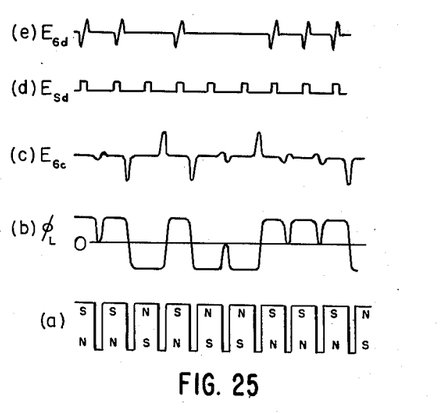
FIG. 25 is a series of graphs illustrating the operation of the transducer of FIG. 23 in both dynamic and static modes.

FIG. 25 shows a sequence of operation for a transducer of the type shown in FIG. 22 which has the biasing magnet 23 and the spacer 21 removed. Assuming the relative tooth polarities shown in FIG. 25a, the flux $\Phi L$ in the saturable element 15 now assumes the form shown in FIG. 25b. Thus, when each slot between like polarized teeth is encountered, the flux is momentarily reduced to a residual value, which may be near 0. However, in a transition between oppositely poled teeth, the flux switches from a first saturated state to a second saturated state. As shown in FIG. 25c, if the disc 1 in FIG. 22 is allowed to rotate at a constant speed, an output voltage pulse of appreciable magnitude and of a polarity dependent on the direction of the flux change is induced by each transition of the flux in FIG. 25b, from one saturated state to the opposite saturated state. A minor disturbance, which can readily be distinguished from a pulse formed by switching from saturation in one sense to saturation in the opposite sense, is formed during the transition between similarly poled teeth. This form of operation may be termed the dynamic mode, in which the disc continues to rotate and a pulse is produced marking each transition from a tooth of one polarity to a tooth of an opposite polarity. For some purposes, it may be desired to sample the polarity to the tooth adjacent the sensing pole 7 when the disc 1 is stationary. To accomplish this result, a train of probe pulses $E_{sd}$ of the type shown in FIG. 25d may be applied to the coil 19 in FIG. 22. The result of these applied probe pulses will be a pair of oppositely poled output pulses if the tooth then in registry with the sensing pole 7 is of one polarity, here illustrated as the south polarity, and no output pulse if the tooth then in registry is a north-poled tooth.

Figure 26:
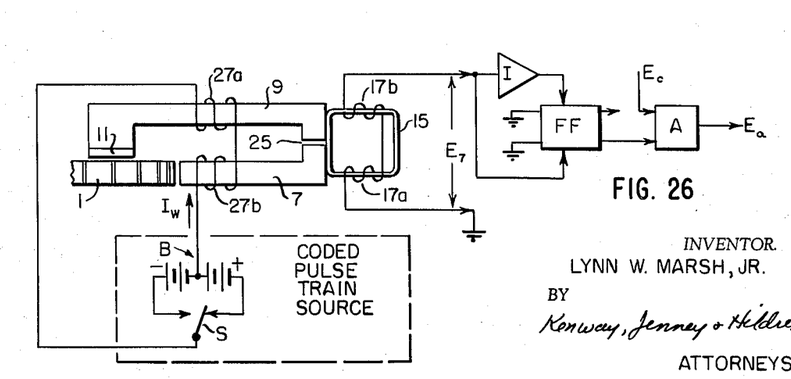
FIG. 26 is a schematic wiring diagram of a transducer in accordance with my invention provided with an output circuit and a circuit for recoding the magnetic disc.

A pattern reproducer of the type described in connection with FIG. 25 may be equipped with write coils to allow modification of the magnetized pattern on the teeth of the permanent magnet disc 1. Referring to FIG. 26, I have shown a transducer which is basically the same as that shown in FIG. 1 except that the sensing pole 7 and the return pole 9 of the primary magnetic circuit are each wound with one of two auxiliary coils 27a and 27b. These coils are wound to be in series-aiding relationship, and are adapted to apply a relatively large pulse of flux in a first or an opposite sense to the primary circuit to change the magnetized state of the tooth then adjacent the sensing pole 7. "Write" pulses of current of appropriate polarity may be provided by a suitable coded pulse train source, which may be timed by a shaft position transducer of the type previously described, and coded in any suitable manner to provide a desired sequence of pulses of current of a first or a second polarity in accordance with the desired magnetized pattern on the teeth of the disc 1. For simplicity, this coded pulse train source has been shown as comprising a manually operable switch S, which is adapted to supply current of a first or a second polarity from a suitable battery B.

As a pattern recognition circuit, I have shown the output of the coils 17a and 17b connected to a conventional flip-flop FF through an inverter I such that an output pulse of one sense will set the flip-flop to one state, and an output pulse of an opposite sense will set the flip-flop to an opposite state. The output potential appearing on one output terminal of the flip-flop FF is applied to a conventional AND gate A, together with a train of sampling pulses $E_c$, which are assumed to be timed by the shaft rotating the disc 1 in such a manner that a pulse is produced just before each tooth leaves registry with the sensing pole 7. The output voltage $E_a$ of the AND gate is shown in FIG. 27h, for the typical conditions illustrated in FIG. 27.

Figure 27:
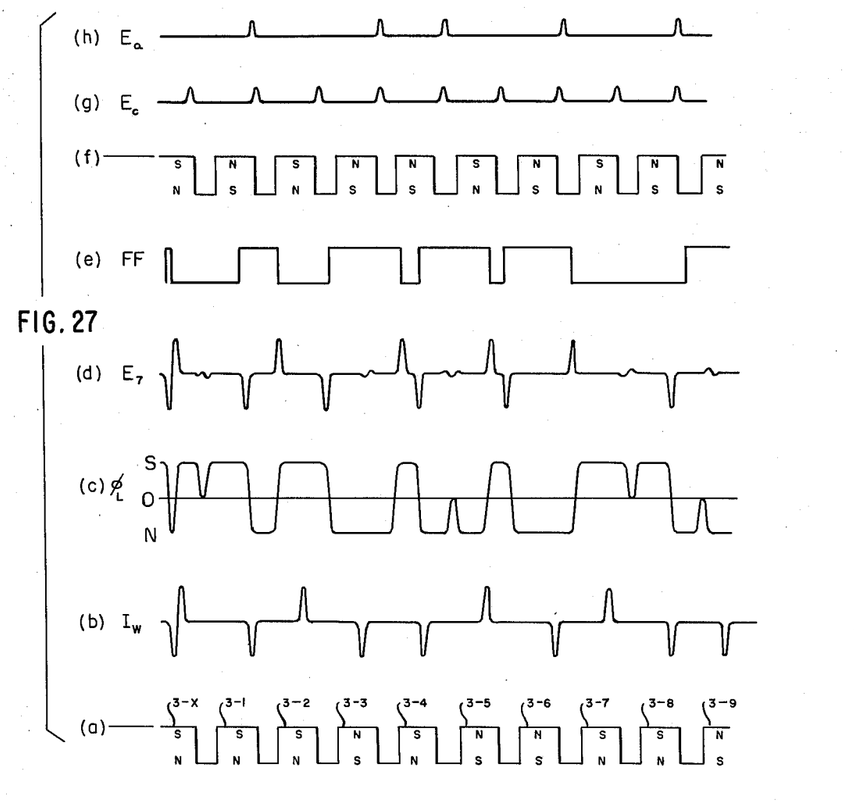
FIG. 27 comprises a series of graphs illustrating the mode of operation of the circuit of FIG. 26.

Referring now to FIG. 27, I have shown the mode of operation of the circuit of FIG. 26 for a typical set of conditions. In FIG. 27a is shown a graph of the portion of the periphery of the disc 1 adjacent the sensing pole 7 as a function of time. Indicated on the graph are a reference tooth 3–X, and nine teeth 3–1 through 3–9, which are assumed to be initially polarized in the manner shown in FIG. 27a. It will be assumed that it is desired to repolarize these teeth in the manner shown in FIG. 27f. This pair of graphs 27a and 27f may thus be regarded as graphs of corresponding portions of the periphery of the disc 1 during a first revolution before re-magnetization, and a second revolution occurring afterwards.

FIG. 27b shows a current $I_w$ applied to the coils 27a and 27b to perform the desired re-magnetization. As shown, a first double pulse of first one and then the opposite polarity is applied in time with the registry of the reference tooth 3–X. This tooth position may be marked electronically by a transducer of the type described in connection with FIG. 1, formed with a single tooth in the manner of an index pulse generator of the type described in my above-referred to copending application.

Referring now to FIG. 27c, the flux in the saturable element 15 in FIG. 26, induced by the applied flux from the teeth passing the sensing pole 7 and the write current $I_w$ applied to the coils 27a and 27b, is shown as a function of time. As the reference tooth 3–X is first reversed in polarity and then switched back to its initial polarity the saturable element 15 is briefly switched from a saturated condition into an opposite saturated condition and then back again. The output voltage $E_7$, shown in FIG. 27d, produced in response to this transition is a negative pulse followed by a positive pulse. As shown in FIG. 27e, this pulse sets the flip-flop first to a state opposite its initial state and then back to its initial state.

The flux changes produced between teeth of the same polarity is insufficient to produce more than a minor disturbance in the output voltage $E_7$. However, the transition between teeth of opposite polarity causes the saturable element to switch from one saturated state to the opposite state. Thus, during the transition between the teeth 3–1 and 3–2, with the tooth 3–1 having been re-written to north polarity and the tooth 3–2 initially of south polarity, an output voltage pulse is produced as shown. Also, each pulse of write current $I_w$ which changes the state of a tooth produces an output pulse of a polarity dependent on the new state of the tooth. As shown, write pulses which do not change the state of a tooth do not result in output pulses in the wave form $E_7$.

The sampling pulses $E_c$, shown in FIG. 27g, are used to check the state of the flip-flop at a time after the write pulse has been applied. These pulses enable the AND gate A to pass an output pulse $E_a$ if the flip-flop FF is in a first state, whereas no pulse is produced if the flip-flop is in its opposite state. Thus, the pulses $E_a$ indicate the new state of each tooth as it is registered with the sensing pole 7. Obviously, the write current need not be applied to rewrite the polarities on the disc at every cycle, and the pulses $E_a$ need only be applied when it is desired to read the state of the disc as it is revolved. Thus, in a high speed printer application, the write pulses may be applied only during the initial preparation of a code wheel with a desired character pulse code sequence, and the sequence of polarities thus produced would be maintained until it was desired to change a character code or a character on the print wheel.

Figure 28:
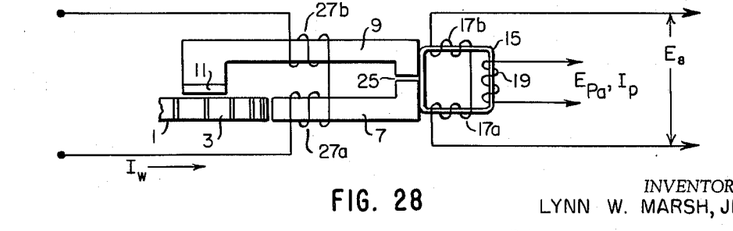
FIG. 28 is a schematic wiring diagram of a transducer in accordance with my invention employed as a code storage and recovery device.
Figure 29:
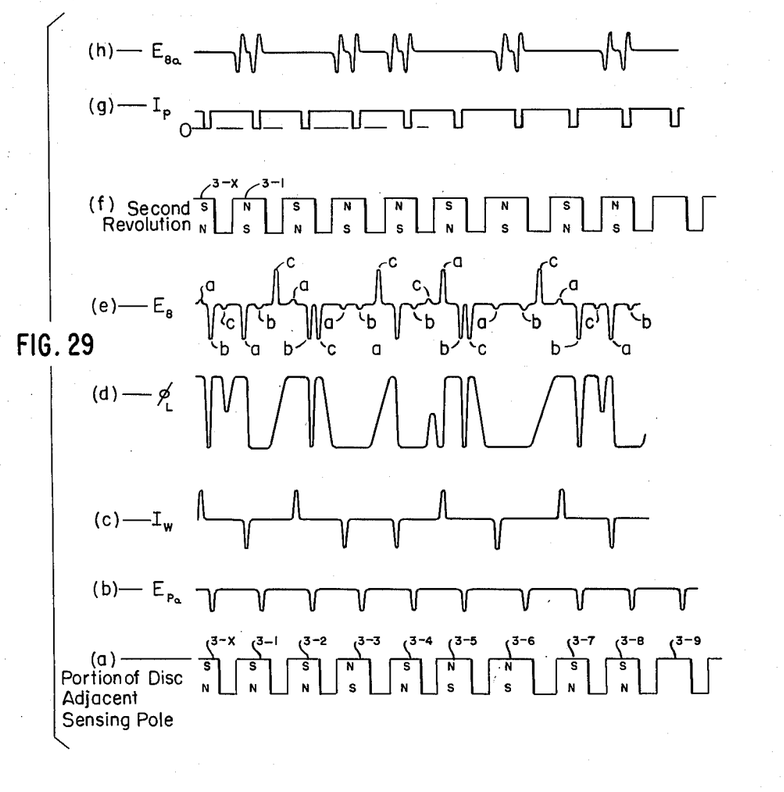
FIG. 29 comprises a series of graphs illustrating the mode of operation of the circuit of FIG. 28.

Referring now to FIG. 28, I have shown an embodiment of my invention which is adapted to a function as an erasable storage unit which has provision for checking a stored code sequence, writing a new code sequence, and checking the results of the writing operation. The transducer itself may be the same as that shown in FIG. 26, except that an auxiliary coil 19 is shown linking the flux in the saturable element 15. Referring to FIG. 29b, this winding is energized with a series of pulses $E_{pa}$ of voltage which are timed with the revolution of the disc 1 to occur just before the sensing pole 7 goes out of registration with each of the teeth 3. These pulses are employed to sample the new polarity of each tooth as it passes the sensing pole. As in FIG. 26, the transducer of FIG. 28 is provided with write coils 27a and 27b which may be energized with pulses of current that are timed with the rotation of the disc 1 and which may serve to repolarize a selected tooth or teeth in a desired sequence. A typical train of write pulses is shown in FIG. 29c.

FIG. 29a shows a series of typical teeth, as they pass adjacent the sensing pole 7, which are magnetized in a typical pattern. As previously discussed, these teeth may be indexed by reference to a particular indexing tooth 3–X which may be selected by a suitable index pulse generator timed with the rotation of the disc 1.

The flux pattern in the saturable element 15 produced by the action of the teeth 3 and the sensing pole 7, the effect of the pulses $E_{pa}$, and the effect of the write pulses $I_w$, is shown in FIG. 29d. Assuming that the maximum flux in the upper direction represents a south pole, and the minimum flux represents a north pole, the initial write pulse $I_w$ will not affect the flux because it is already saturated in the south sense. However, the next following probe pulse $E_{pa}$ will switch the saturable element to its north saturated state, producing a momentary flux reversal as shown. As indicated for the transition between the teeth 3–X and 3–1, a transition between two like polarized teeth will produce a relative small flux change compared to the flux change that occurs when switching is accomplished.

The output voltage $E_8$ from the coils 17a and 17b is shown in FIG. 29e. The wave form comprises three sets of pulses, labeled $a$, $b$, and $c$, which occur at different selected times in the relative positioning of the sensing pole 7 and a particular tooth.

The pulses $a$ are each associated with a write pulse. The pulses $a$ will be small if the write pulse is in the same sense as the then state of saturation of the saturable element 15. Thus, there will be a small positive pulse $a$ for each south writing pulse $I_w$ which occurs when a south-polarized tooth is adjacent the sensing pole. There will be a small negative pulse $a$ for each north-writing pulse $I_w$ which coincides with a north-polarized tooth. Similarly, there will be a large positive pulse $a$ when a south-writing pulse $I_w$ occurs when a north-polarized tooth is adjacent the sensing pole, and a large negative pulse $a$ when a north-writing pulse $I_w$ coincides with a south-polarized tooth.

The pulses $b$ are associated in time with the probe pulses $E_{pa}$. These pulses will always be of the same polarity, and will be large if the tooth is south polarized when the probe pulse occurs, and small if the tooth is north-polarized when the pulse occurs.

The pulses $c$ are each associated with the transition between teeth. If the teeth are of the same polarity, a small pulse will be produced, which is positive or negative according as the teeth are north- or south-poled. A large pulse $c$ will be produced if the transition is between teeth of opposite polarity, and this pulse will be positive or negative in accordance with the direction of the transition.

The new state of the teeth in the example given, after the application of the train of write pulses shown in FIG. 29c, will be as shown in FIG. 29f. Thus, the graph of FIG. 29f may be considered to represent a second revolution of the disc with no write pulses applied. It will be apparent that by properly interpreting the voltage $E_8$, as by sampling it at the appropriate time and checking it for magnitude and polarity, all of the information about the writing operation and the original and final state of the teeth may be derived.

The circuit of FIG. 28 may also be operated in a biased mode, in which bias current $I_p$ is applied as shown in FIG. 29g, and this current is interrupted at times when it is desired to check the state of the teeth. This interruption time may coincide with the times of the pulses $E_{pa}$ in FIG. 29b. As shown, the voltage output $E_{8a}$ in FIG.

29h comprises a series of pairs of pulses for each write pulse which directs a tooth to be written to north polarity and which is followed by the successful writing of the tooth in that polarity. Specifically, assuming that the current $I_p$ is of a sense to bias the saturable element to its south saturated state, overcoming the effect of a north-polarized tooth except when it is interrupted but insufficient to overpower the strong write current pulses, each north-directed write pulse will result in a positive and negative pulse pair $E_{8a}$, and the succeeding interruption of the biasing current $I_p$ will also cause negative and positive pulses to be formed, if the writing has been successfully accomplished. By properly interpreting this voltage wave form $E_{8a}$, the new code sequence may be checked for conformity with the directed sequence.

Figure 30:
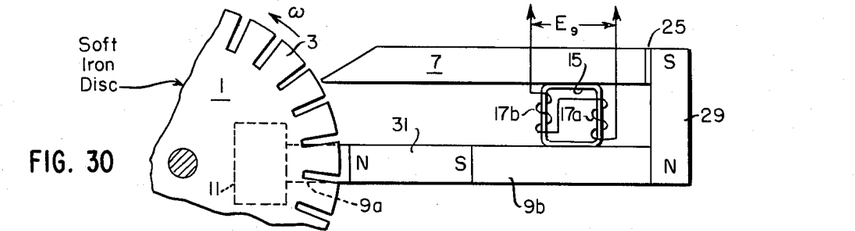
FIG. 30 comprises a fragmentary schematic elevational view of a transducer in accordance with a modified form of my invention.

Referring now to FIG. 30, I have shown an alternate embodiment of my invention which is adapted to be employed as a pulse generator for marking each selected increment of angular motion of the disc 1. As shown, the disc 1 may be provided with teeth 3 as before. However, in this case the disc 1 is made of soft iron, and is not intended to be permanently magnetized in operation. In this embodiment, the return pole 9 comprises a first section 9a of low reluctance iron, connecting the low reluctance pole shoe 11 to a permanent magnet 31. The permanent magnet 31 is joined to a second portion 9b of the return pole, which may be made of low reluctance material. A second permanent magnet 29 joins the return pole 9b to the sensing pole 7 through a suitable spacer 25. As shown, the saturable loop 15 is now mounted between the sensing pole 7 and the return pole portion 9b. The electromagnetic coil, comprising the coils 17a and 17b, is wound about the saturable element 15 as before, except that the flux will be in the same sense in both of the legs of the loop 15 on which the coils 17a and 17b are wound, so that these coils must be interconnected as shown so that the induced voltages will add.

Figure 31:
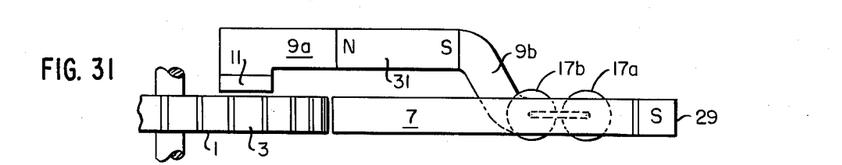
FIG. 31 comprises a fragmentary plan view of the transducer of FIG. 30.

FIG. 31 shows one manner in which the portions 9b, 31 and 9a of the return pole may be arranged to properly position the pole shoe 11 with respect to the body of the disc 1.

Figure 23:
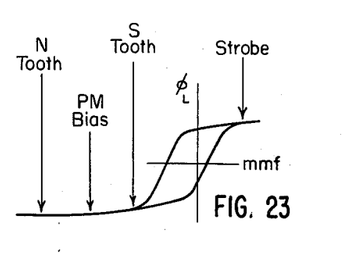
FIG. 23 comprises a graph of a typical hysteresis loop for the secondary circuit of FIG. 22 and illustrating the mode of operation thereof.

Assuming that the magnets 29 and 31 are poled as shown in FIG. 23, there are two states of the magnetic circuit which occur during the rotation of the disc 1; a first, in which the sensing pole 7 is in registry with a tooth 3, and the reluctance $R_a$ of the gap between the sensing pole 7 and the disc is at a minimum, and a second, in which the sensing pole is in registry with a slot, and the reluctance $R_a$ is at a maximum. Denoting the reluctance of the gap provided by the spaces 25 by $R_b$, the maximum value of $R_a$ should be greater than $R_b$, and the minimum value of $R_a$ should be less than $R_b$. As will appear, the sharpness of the output pulses produced by this embodiment of my invention will be determined by the magnitude of the differences between the maximum and minimum values of $R_a$ and $R_b$.

There are three magnetic circuit paths in the apparatus of FIGS. 30 and 31. A first extends from the north pole of the magnet 31 through the pole piece 9a and the pole shoe 11, across an effectively small gap to the disc 1, across the variable gap of reluctance $R_a$ to the sensing pole 7, through the arms of the loop 15 carrying the coils 17a and 17b to the pole piece 9b, and thence to the south pole of the magnet 31. A second path extends from the north pole of the magnet 29 through the pole piece 9b, the arms of the loop 15 carrying the coils 17a and 17b, the sensing pole 7, and across the gap formed by the spaces 25, which has a fixed reluctance $R_b$, to the south pole of the magnet 29. A third path, which is not effective in the control of the flux in the loop 15, comprises the magnets 29 and 31 and the primary pole pieces in series.

Figure 32:
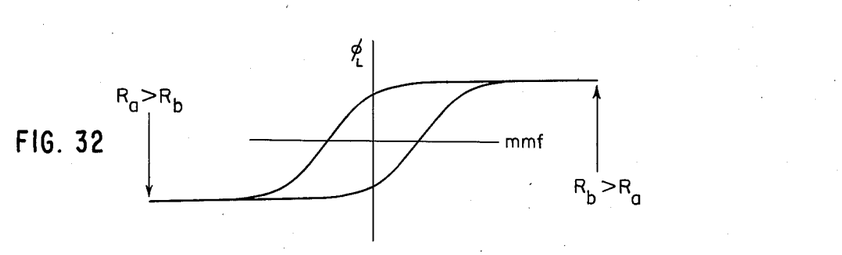
FIG. 32 comprises a graph of the hysteresis loop of the secondary circuit in the transducer of FIGS. 30 and 31.

Referring now to FIG. 32, when the sensing pole 7 is in registry with a tooth 3, the first path described above will have a lower reluctance than the second path because $R_a$ is smaller than $R_b$, the other reluctances being made greatly smaller than $R_b$ with the exception that the reluctance of the arms of the loop 15, common to both the first and second paths, may be of the same order of magnitude as the reluctance $R_b$ if so desired. Thus, the arms of the loop 15 will be saturated in a first sense by the flux from the magnet 31, less a small component from the magnet 29. When the sensing pole passes over a slot, the reluctance of the second path will be smaller than that of the first, since $R_a$ is now greater than $R_b$. Thus, the arms of the loop 15 will now be saturated in an opposite sense by the flux from the magnet 29, less a small component from the magnet 31. It will be apparent that in the transition from one state to the other, a pulse of voltage will be induced in the coils 17a and 17b.

Referring to FIG. 32, the additive effect of these magnets 29 and 31 will suffice to induce a flux through the saturable element 15 which will saturate it in one sense. When the sensing pole passes over a slot between teeth, the primary circuit just described is interrupted, and the magnet 29 alone acts through a shorter circuit including the arms of the saturable element 15 to induce opposite flux sufficient to saturate the saturable element in the opposite sense.

Figure 33:
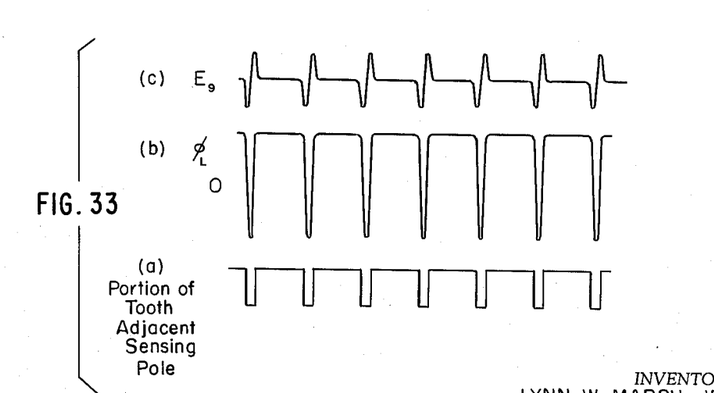
FIG. 33 comprises a series of graphs illustrating the mode of operation of the transducer of FIGS. 30 and 31.

Referring now to FIG. 33, the flux in the element 15 and the output voltage $E_9$ are shown as a function of the time and compared with the relative position of the teeth with respect to the sensing pole 7. As shown, there is a complete reversal of flux as each slot is encountered, and a corresponding pair of pulses $E_9$, comprising a negative and a positive pulse, are produced in the output coils 17a and 17b for each such transition. Either the positive pulse portion or the negative pulse portion may be taken as a trigger to establish timing based on the reference position of the slots on the disc 1 with respect to the shaft which turns the disc.

Figure 34:
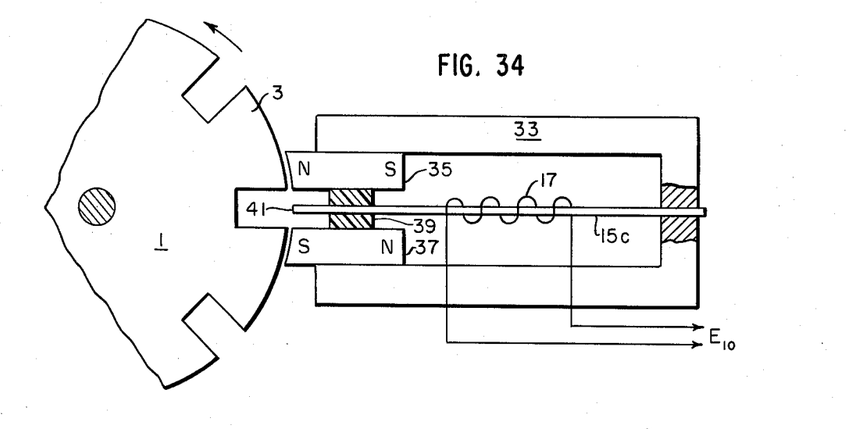
FIG. 34 comprises a fragmentary schematic plan view of a transducer in accordance with a modified form of my invention.

Referring now to FIG. 34, I have shown an embodiment of the transducer of my invention which employs a pair of alternately energized magnetic circuits each including a single common saturable element. As shown, the circuit comprises a first magnetic pole element 33 of low reluctance material which is formed in essentially a U-shape with a hole drilled at one end to receive the saturable element 15c. The saturable element 15c extends at the other end through a suitable hole in a spacer 39, which may be of plastic or the like. A first permanent magnet 35 is mounted between the spacer 39 and one arm of the pole piece 33, and a second oppositely poled magnet 37 is located between the spacer 39 and the other leg of the pole piece 33. An output coil 17 is wound to link the flux in the saturable element 15c, as before.

Figure 35:
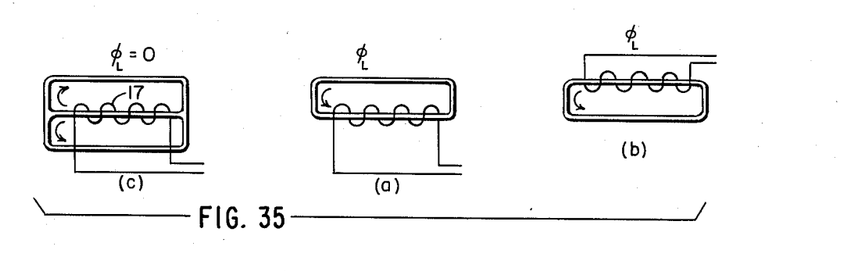
FIG. 35 comprises a series of schematic wiring diagrams illustrating the mode of operation of the transducer in FIG. 34.

The assembly just described is mounted on a suitable support member, not shown, for registry with the teeth 3 of the disc as shown in FIG. 34. There are four relative positions of the transducer and the teeth 3 which are of significance in the operation of the apparatus of FIG. 34. First, in the position shown, with the saturable element 15c having its end 41 adjacent a gap between teeth on the disc, there is no effective magnetic circuit through the saturable element. Thus, the effective flux at this time is 0. Second, with the end 41 of the saturable element 15c and the magnet 35 in registry with the tooth, a first circuit is completed for the passage of flux which extends from the north pole of the magnet 35 through the tooth 3, back to the saturable element 15c, and thence through the upper portion of pole piece 33 to the south pole of the magnet 35. This will produce a flux in a first sense in the saturable element 15c, as shown in FIG. 35a. Third, if the end 41 of the element 15c and the magnet 37 both register on a tooth, a second magnetic circuit is completed which extends from a south pole of the magnet 37. This will produce a flux in an opposite sense in the element 15c, as shown in FIG. 35b. Fourth, if both of the magnets 35 and 37 are registering with the tooth and the end 41 of the saturable element 15c is also registering with a tooth, both of the previously described circuits are established, resulting in a flux null as in the position first described.

Figure 36:
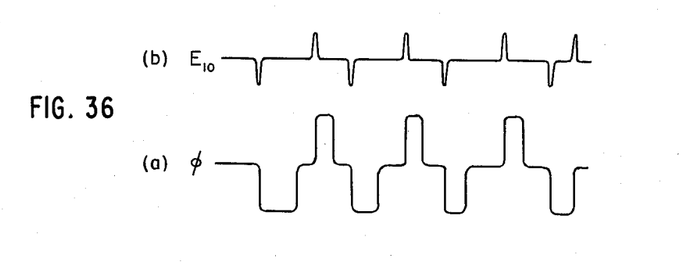
FIG. 36 comprises a series of graphs illustrating the mode of operation of the transducer of FIG. 34.

Referring now to FIG. 36, the flux pattern produced is shown in FIG. 36a, and the corresponding voltage output pulses $E_{10}$ are shown in FIG. 36b.

While I have described various embodiments of my invention in detail, many changes will be apparent to those skilled in the art after reading my description, and such can obviously be made without departing from the scope of my invention.

Having thus described my invention, what I claim is:

1. A pulse generator, comprising a ferromagnetic disc mounted for rotation about a central axis and comprising a body portion and projecting teeth about the periphery of the body portion, a first magnetic conductor having one end adjacent the periphery of the disc and a second end adjacent a first end of a second magnetic conductor and separated therefrom by a first predetermined high reluctance gap, said second magnetic conductor having a second end terminating in a pole shoe located adjacent and separated from the body portion of the disc by a gap having a small reluctance relative to the reluctance of said first gap, a separate path comprising a biasing magnet and a non-magnetic spacer connected between said conductors intermediate their ends, a saturable element magnetically coupled to said conductors in the region of said first gap, and an electromagnetic coil linking the flux in said saturable element.

2. In combination, a ferromagnetic disc mounted for rotation about a central axis and comprising a body portion and projecting teeth about the periphery of the body portion, at least one of said teeth being magnetized in a predetermined sense, a first magnetic conductor having a first end adjacent the periphery of the disc and a second end, a second magnetic conductor having a first end adjacent the second end of said first conductor and separated therefrom by a first predetermined high reluctance gap, said second magnetic conductor having a second end terminating in a pole shoe located adjacent and separated from the body portion of the disc by a gap having a small reluctance relative to the reluctance of said first gap, a saturable element magnetically coupled to said conductors in the region of said first gap, a separate path comprising a biasing magnet magnetically connected between said conductors intermediate their ends and producing flux in said saturable element sufficient to saturate it when unopposed, first and second electromagnetic coils linking the flux in said saturable element, and means for applying a current pulse to said first coil in a sense opposing the flux of said biasing magnet in said saturable element to permit the saturable element to be driven to saturation in an opposite sense, producing a pulse in said second coil, when and only when a tooth on said disc magnetized in said predetermined sense is adjacent the first end of said first magnetic conductor.

References Cited by the Examiner

UNITED STATES PATENTS

| | | | |
|---|---|---|---|
| 1,582,044 | 4/1926 | Horton | 310—111 |
| 1,647,645 | 11/1927 | Marrison | 310—111 |
| 2,427,213 | 9/1947 | Jewell | 340—197 |
| 2,450,404 | 9/1948 | Bohn | 310—111 |
| 2,661,009 | 12/1953 | Dunnegan | 340—197 |
| 2,719,930 | 10/1955 | Lehde | 310—111 |
| 2,736,869 | 2/1956 | Rex | 340—197 |
| 2,740,110 | 3/1956 | Trimble | 340—364 |
| 2,741,757 | 4/1956 | Devol | 340—197 |
| 2,786,182 | 3/1957 | Herbert | 340—364 |
| 3,053,993 | 9/1962 | Barber | 340—345 |

FOREIGN PATENTS 251,599   10/1912   Germany.

ORIS L. RADER, *Primary Examiner.*

MILTON O. HIRSCHFIELD, *Examiner.*